(12) United States Patent
Dotterer

(10) Patent No.: US 8,640,647 B2
(45) Date of Patent: Feb. 4, 2014

(54) ADJUSTABLE PET FORAGING FEEDER AND WOBBLE TOY

(75) Inventor: Brian D. Dotterer, Shelby Township, MI (US)

(73) Assignee: Straycat Enterprises, LLC, Shelby Township, MI (US)

( * ) Notice: Subject to any disclaimer, the term of this patent is extended or adjusted under 35 U.S.C. 154(b) by 167 days.

(21) Appl. No.: 13/113,641

(22) Filed: May 23, 2011

(65) Prior Publication Data

US 2012/0298044 A1   Nov. 29, 2012

(51) Int. Cl.
*A01K 5/00* (2006.01)
*A01K 29/00* (2006.01)

(52) U.S. Cl.
USPC .................................. 119/51.01; 119/707

(58) Field of Classification Search
USPC ......... 119/51.01, 70, 702, 707, 709, 710, 711
See application file for complete search history.

(56) References Cited

U.S. PATENT DOCUMENTS

| | | | |
|---|---|---|---|
| 2,086,631 A * | 7/1937 | Munro | 119/711 |
| 5,758,604 A * | 6/1998 | Jørgensen | 119/711 |
| 6,073,581 A * | 6/2000 | Wang | 119/51.01 |
| 6,167,841 B1 * | 1/2001 | Ho | 119/61.54 |
| 6,217,408 B1 | 4/2001 | Willinger | |
| 6,237,538 B1 | 5/2001 | Tsengas | |
| 6,484,671 B2 | 11/2002 | Herrenbruck | |
| 6,990,762 B1 | 1/2006 | Muday et al. | |
| 7,278,374 B2 * | 10/2007 | Mann | 119/710 |
| 7,631,613 B2 * | 12/2009 | Lescroart | 119/51.01 |
| 8,225,747 B2 * | 7/2012 | Markham et al. | 119/51.01 |
| 2008/0083378 A1 * | 4/2008 | Pearce | 119/707 |
| 2009/0314221 A1 * | 12/2009 | Wang | 119/707 |
| 2012/0012068 A1 * | 1/2012 | Costello | 119/707 |
| 2012/0318210 A1 * | 12/2012 | Anderson | 119/710 |

FOREIGN PATENT DOCUMENTS

| | | |
|---|---|---|
| CN | 2731968 Y | 10/2005 |
| CN | 101444190 A | 6/2009 |
| KR | 20040081083 A | 9/2004 |

\* cited by examiner

*Primary Examiner* — Son T Nguyen
*Assistant Examiner* — Kathleen Alker
(74) *Attorney, Agent, or Firm* — Fraser Clemens Martin & Miller LLC; J. Douglas Miller

(57) ABSTRACT

The feeder toy is designed for cats and small dogs. The device is formed from a non-toxic, eco-friendly food grade plastic. The rounded, weighted profile provides a self-propelled motion, eliminating the need for any batteries. The innovative design wobbles and moves about the floor, forcing a pet to move and interact with the toy in order to eat. The unique food-dispensing hole adjusts by rotating the two ends; allowing for different sized dry food and dispensing rates. Holes at the bottom allow trapped bits to escape. The two ends come apart for easy filling and cleaning.

20 Claims, 1 Drawing Sheet

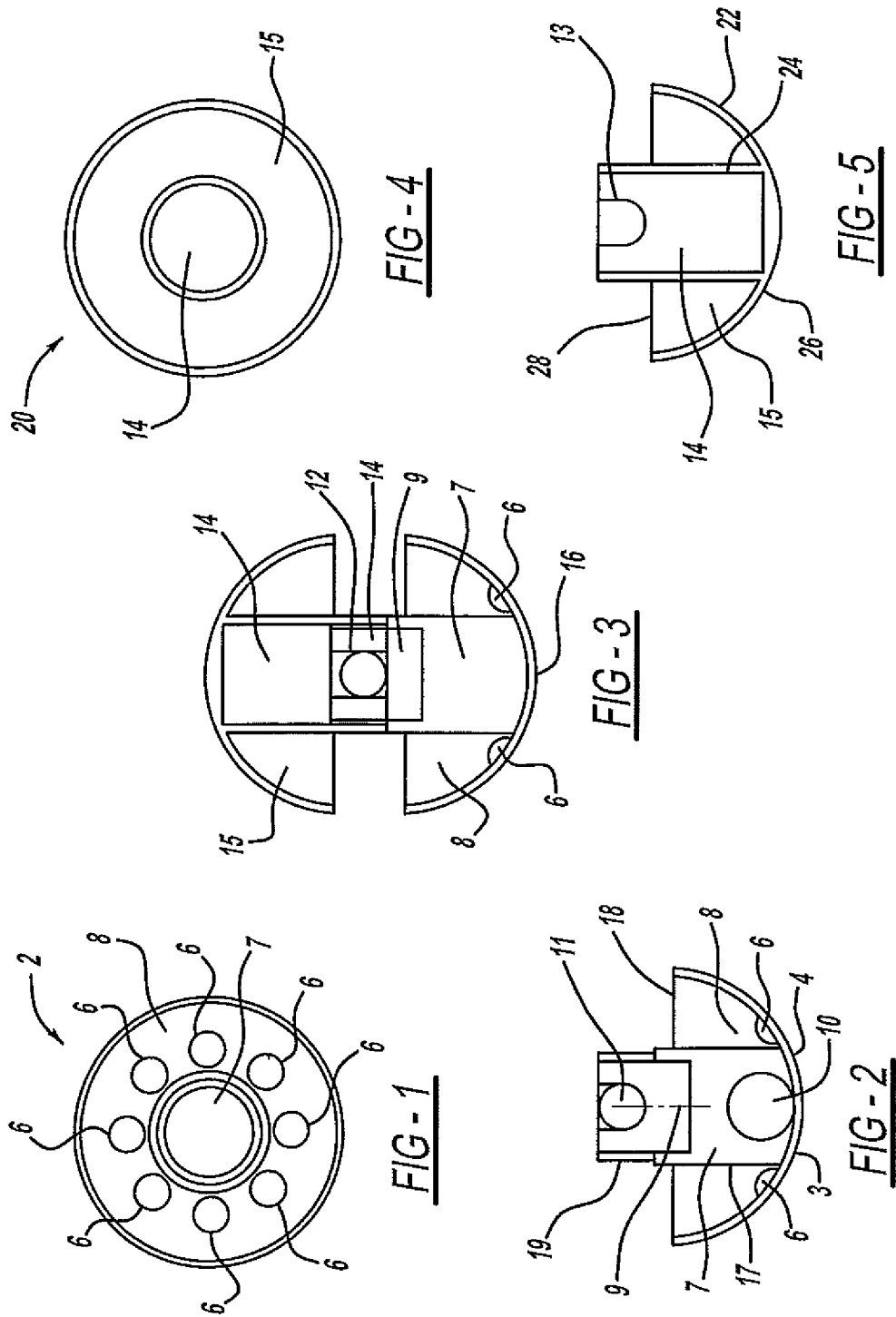

ADJUSTABLE PET FORAGING FEEDER AND WOBBLE TOY

FIELD OF THE INVENTION

The invention relates to a special feeding device for pets and other animals that allows for controlled feeding while providing exercise and stimulation for the pet.

BACKGROUND OF THE INVENTION

Domestic indoor pets have a tendency to gain excess weight due to excessive feeding and limited exercise. In addition, many pets eat too fast causing regurgitation of food. Additionally, animals such as those housed in a zoo or other facility may need stimulation and food input control. Standard feeding systems provide little stimulation and do not control the speed in which a pet eats. While there are many toys on the market and some feeding devices, there are no systems that combine these two features in this unique way.

U.S. Pat. No. 6,237,538 to Tsengas is a pet toy ball feeder that has a two hollow semi spherical ends that snap together with a static hole by which food drops out as the ball is rolled around. However, the hole is not adjustable to allow for different sized food particles or speed of feeding, nor does the ball provide the "bob" which provides more stimulation for pets.

U.S. Pat. No. 6,217,408 to Willinger is a self-righting pet toy having a hemispherical base but the top is comprised of radiating arms therefore limiting the pet's ability to spin and attack the toy. In addition, it is chewable material with no ability to hold food. Finally, all pets do not chew so this toy would be inappropriate for some pet use, such as cats.

U.S. Pat. No. 6,484,671 to Herrenbruck is a treat dispensing toy that provides an audio feed in conjunction with a treat reward. Herrenbruck uses barriers to retard dispensing of treats.

U.S. Pat No. 6,990,762 to Muday and Buttenob is a pet amusement device that includes a weighted base that bobs and returns but it does not provide a feeding system.

None of these feeding devices provide a controlled, time released feeding in conjunction with exercise and stimulation.

SUMMARY OF THE INVENTION

In concordance and agreement with the present invention, a special feeding device comprising an adjustable feeding system and play action will provide unique feed and play system. Its adjustable opening can handle a variety of food sizes and also the speed in which it releases food providing controlled feeding, stimulation and exercise for the pet or other animals. The device is formed from a non-toxic, eco-friendly food grade plastic. The rounded, weighted profile provides a self-propelled motion, eliminating the need for any batteries. The innovative design wobbles and moves about the floor, forcing your pet to move and interact with the toy in order to eat. The unique food-dispensing hole adjusts by rotating the two ends; allowing for different sized dry food and dispensing rates. Holes at the bottom allow trapped bits to escape. The two ends come apart for easy filling and cleaning. While the description of the invention is directed to domesticated pets such as dogs and cats, the invention can be adapted for many other animals such as ferrets, rabbits and larger animals as well.

Accordingly, several advantages are provided with this special feed and play system: prolonged eating controls eating behavior that results in regurgitation in pets that eat too fast, the action of the feeder provides exercise as it compels the animal to use their paws, or pedal extremity generally, and move the toy to get fed, and the adjustable nature allow for any sized dry treat or kibble to be used. In addition, the puzzle nature of the toy stimulates the brain as well, which is said to be beneficial in keeping animals mentally alert and can help them from becoming bored.

DESCRIPTION OF THE DRAWINGS

The above, as well as other advantages of the present invention, will become readily apparent to those skilled in the art from the following detailed description of a preferred embodiment when considered in the light of the accompanying drawings in which:

FIG. 1 illustrates a bottom view of the lower hemisphere of the feed and play system of the present invention;

FIG. 2 illustrates an internal side view of the lower hemisphere;

FIG. 3 illustrates an internal side view of the feed and play system of the present invention with the upper and lower hemisphere combined to form a single unit:

FIG. 4 illustrates a top view of the upper hemisphere; and

FIG. 5 illustrates an internal side view of the upper hemisphere.

DESCRIPTION OF THE PREFERRED EMBODIMENTS

The following detailed description and appended drawings describe and illustrate various exemplary embodiments of the invention. The description and drawings serve to enable one skilled in the art to make and use the invention, and are not intended to limit the scope of the invention in any manner.

With reference to FIGS. 1 and 2, the lower hemisphere 2 of the adjustable pet foraging feeder and wobble toy 16 of the present invention is there shown and includes a rounded base 4 profile having at least one, and preferably several feeder holes 6 placed strategically about the base 4 of the lower hemisphere 2. The holes 6 are preferably round, but it is within the scope of the invention to provide any shaped openings in any arrangement along the entire base 4 of the lower hemisphere 2. The base 4 is generally hollow, including a lower hollow open area 8, and forms half a sphere.

A channel 7 extends from the bottom area 3 of the base 4 and above the edge 18 of the base 4. The lower portion 17 of the channel 7 holds a weight, such as a steel weight 10, while the upper portion 19 of the channel 7 supports a separate cup area 9 for placing food. A bottom feed opening 11 is provided in the cup area 9. The opening is preferably shaped as half of an oval and joined to form a complete oval with the corresponding top feed opening 13 described below. The upper portion 19 of the channel 7 has a smaller diameter than the lower portion 17 for seating the upper hemisphere 20.

FIGS. 4 and 5 illustrate a preferred embodiment of the upper hemisphere 20 of adjustable pet foraging feeder and wobble toy 16 of the present invention. The upper hemisphere 20 has a similar rounded profile as the lower hemisphere forming a top 22 and includes a hollow open area 15 to form half a sphere. A channel 24 extends from the bottom area 26 of the top 22 and above the edge 28 of the top 22. The interior of the channel 24 is hollow and provides a top food holder 14. A top feed opening 13 is provided and is preferably shaped as half an oval. It is understood that the top and base feed opening can be formed of any shape and remain within the scope of the invention.

FIG. 3 illustrates an internal side view of the present invention with the upper hemisphere 20 seated onto the upper portion 19 of channel 7 of the lower hemisphere 2 forming the adjustable pet foraging feeder and wobble toy 16. The bottom feed opening 11 and top feed opening 13 join to form an adjustable food-dispensing hole 12.

In a preferred embodiment, the upper hemisphere 20 is void of a weight and feeder holes. The toy 16 is preferably a gravity feeder, providing a weight 10 only in the base 4 of the toy 16 to self-right the toy 16 in an upright position. Feeder holes 6 are provided in the base 2 to release any food that falls from the adjustable food-dispensing hole 12 into the hollow area of the base 4.

The overall size and color of the adjustable pet foraging feeder and wobble toy 16 may vary depending on the size of the pet and the type of pet. In a preferred embodiment, the color of the toy is bright green because the color spectrum of cats is known to be blue and green. Additionally, the size varies based on the type of pet—cats tend to paw and therefore, the toy may be smaller—while dogs tend to bite and therefore, the toy may be larger so that it won't fit within a dog's mouth.

In operation, the adjustable pet foraging feeder and wobble toy 16 is separated into its upper 20 and lower 2 hemispheres. Food, preferably dry food, may be placed in one or both food areas 9, 14. The channel 24 of the upper hemisphere 20 is seated on top of the upper portion 19 of the channel 7 of the lower hemisphere. The upper and lower hemispheres may be rotated to adjust the size of the adjustable food-dispensing hole 12 in a full range from its widest opening when both half ovals are aligned to complete closure of the opening for use only as a toy. In a preferred embodiment, a locking mechanism such as a series of detents (not shown) may be provided to secure the desired size of the food-dispensing hole 12 in place. Adjusting the size of the food-dispensing hole 12 regulates the food-dispensing rate. Alternatively, the size of the food-dispensing hole 12 may be adjusted to compensate for the corresponding size of the food within the food areas 9, 14.

The toy 16 is then placed on the floor for the pet to play with. The weight 10 will self right the toy 16 and allows the toy to wobble and roll. When the pet bats the toy 16 with his paw, the toy 16 may spin, bob, weave and travel across the floor. The toy 16 will only dispense food from the food-dispensing hole 12 when the pet engages with the toy 16. The weighted base 4 provides a gravity feed, releasing the food from the food-dispensing hole 12 downward toward the floor. If the food is trapped within the lower hemisphere 2, the feeder holes 6, will release the food to the floor.

The innovative design wobbles and moves about the floor, forcing the pet to move and interact with the toy in order to eat. The unique food-dispensing hole adjusts by rotating the two hemispheres; allowing for different sized dry food and dispensing rates. Feeder holes at the base allow trapped bits to escape. The two hemispheres come apart for easy filling and cleaning.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. An adjustable pet foraging feeder and wobble toy comprising:
   a lower hemisphere including a lower hollow open area within an interior of the lower hemisphere, the lower hollow open area disposed around a lower channel extending from the interior of the lower hemisphere, a wall of the lower channel forming a bottom food area inside the lower channel, the wall including a bottom feed opening to the bottom food area; and
   an upper hemisphere including an upper hollow open area within an interior of the upper hemisphere, the upper hollow open area disposed around an upper channel extending from the interior of the upper hemisphere, a wall of the upper channel forming a top food area inside the upper channel, the wall including a top feed opening to the top food area;
   wherein, the lower channel is coupled to the upper channel thereby coupling the bottom food area to the top food area, and the bottom feed opening and the top feed opening cooperate to form an adjustable food dispensing hole.

2. The adjustable pet foraging feeder and wobble toy of claim 1, wherein the bottom feed opening is an indentation formed in an edge of the wall forming the bottom food area and the top feed opening is an indentation formed in an edge of the wall forming the top food area.

3. The adjustable pet foraging feeder and wobble toy of claim 1, wherein the wall of the lower channel further includes a seat formed on an exterior surface thereof, wherein the seat contacts the upper channel when the upper channel is coupled to the lower channel.

4. The adjustable pet foraging feeder and wobble toy of claim 1, wherein the upper channel is rotatable about the lower channel when the upper channel is coupled to the lower channel.

5. The adjustable pet foraging feeder and wobble toy of claim 4, wherein a size of the food-dispensing hole is adjusted when the upper channel is rotated about the lower channel.

6. The adjustable pet foraging feeder and wobble toy of claim 1, further comprising a weight disposed within the lower hemisphere for self-righting the toy.

7. The adjustable pet foraging feeder and wobble toy of claim 6, wherein the weight is disposed within the lower channel of the lower hemisphere adjacent a base of the lower hemisphere from which the lower channel extends.

8. The adjustable pet foraging feeder and wobble toy of claim 1, further comprising at least one feeder hole formed within the lower hemisphere for further dispensing food from the lower hollow open area of the lower hemisphere to an exterior of the lower hemisphere.

9. The adjustable pet foraging feeder and wobble toy of claim 1, wherein an edge defining an open end of the lower hemisphere is spaced apart from an edge defining an open end of the upper hemisphere when the upper channel is coupled to the lower channel to thither dispense food from the toy.

10. The adjustable pet foraging feeder and wobble toy of claim 1, wherein the top feed area of the upper channel and the bottom feed area of the lower channel cooperate to form a chamber within the cooperating upper and lower channels for storing food therein, the adjustable food-dispensing hole providing a passageway for the food to exit the open chamber of the cooperating upper and lower channels.

11. An adjustable pet foraging feeder and wobble toy comprising:
   a lower hemisphere including a lower hollow open area within an interior of the lower hemisphere, the lower hollow open area disposed around a lower channel extending from the interior of the lower hemisphere, a wall of the lower channel forming a bottom food area inside the lower channel, the wall of the lower channel including a bottom feed opening to the bottom food area, the wall of the lower channel further including a seat formed thereon; and an upper hemisphere including an upper hollow open area within an interior of the upper hemisphere, the upper hollow open area disposed around an upper channel extending from the interior of the upper hemisphere, a wall of the upper channel forming a top food area inside the upper channel, the wall of the upper channel including a top feed opening to the top food area;

wherein the bottom and top feed openings cooperate to form an adjustable food-dispensing hole when the upper channel is seated on the seat formed on the wall of the lower channel.

12. The adjustable pet foraging feeder and wobble toy of claim 11, wherein an edge defining an open end of the upper hemisphere is spaced apart from an edge defining an open end of the lower hemisphere when the upper channel is seated on the seat of the lower channel for further dispensing food from the toy.

13. The adjustable pet foraging feeder and wobble toy of claim 12, wherein the bottom feed opening is an indentation formed in an edge of the wall forming the bottom food area and the top feed opening is an indentation formed in an edge of the wall forming the top food area.

14. The adjustable pet foraging feeder and wobble toy of claim 13, wherein the top food area of the upper channel cooperates with the bottom food area of the lower channel when the upper channel is seated on the seat of the lower channel to form a chamber within the cooperating upper and lower channels for storing food therein.

15. The adjustable pet foraging feeder and wobble toy of claim 14, wherein the upper channel is rotatable about the lower channel when the upper channel is seated on the seat of the lower channel.

16. The adjustable pet foraging feeder and wobble toy of claim 15, wherein a size of the adjustable food-dispensing hole is adjusted when the upper channel is rotated about the lower channel.

17. The adjustable pet foraging feeder and wobble toy of claim 16, further comprising a weight within the lower hemisphere for self-righting the toy.

18. The adjustable pet foraging feeder and wobble toy of claim 17, wherein the weight is disposed within the lower channel of the lower hemisphere adjacent a base of the lower hemisphere from which the lower channel extends.

19. The adjustable pet foraging feeder and wobble toy of claim 18, further comprising at least one feeder hole formed within the lower hemisphere for further dispensing food from the lower hollow open area of the lower hemisphere to an exterior of the lower hemisphere.

20. The adjustable pet foraging feeder and wobble toy of claim 19, wherein each of the at least one feeder holes is formed in the lower hemisphere adjacent the lower channel extending from the lower base.

\* \* \* \* \*